Jan. 23, 1951 V. S. FIRESTONE 2,539,240
METHOD AND APPARATUS FOR CUTTING TIRE TREAD STOCK
Filed March 31, 1948 5 Sheets-Sheet 1
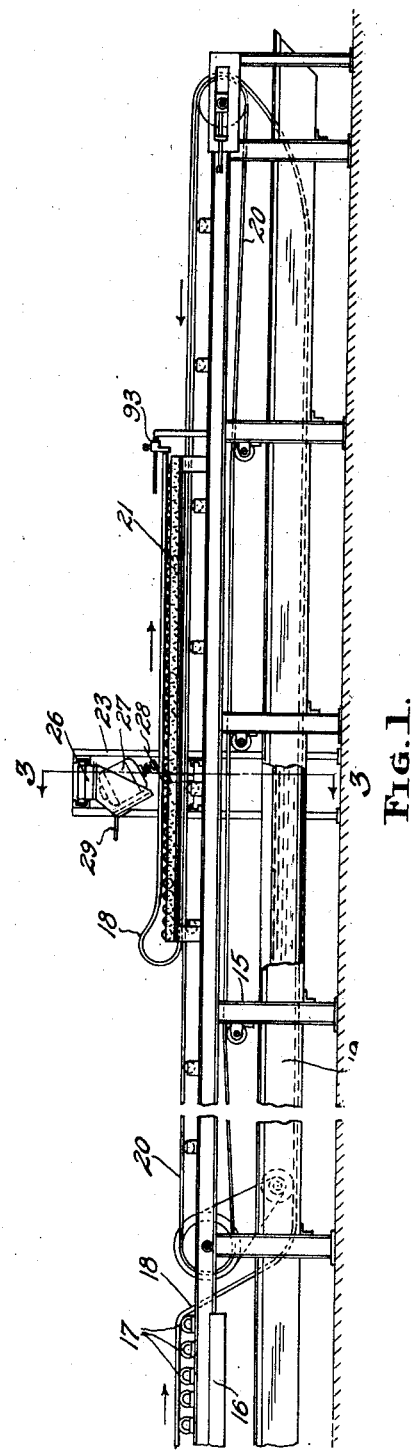
Fig. 1.
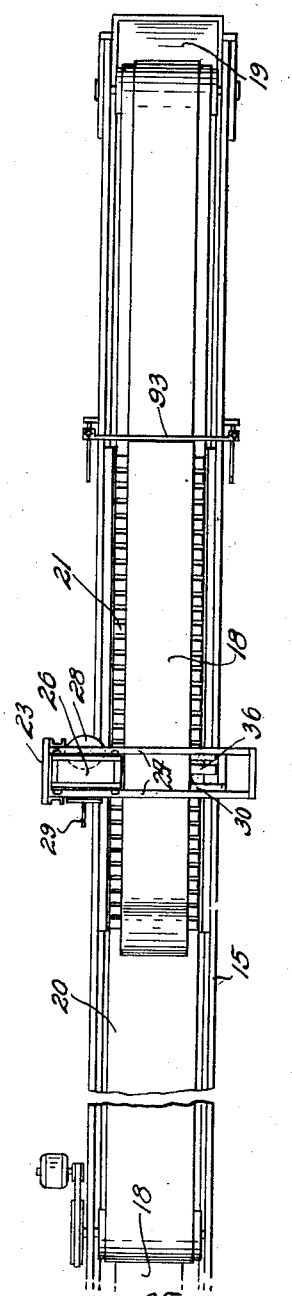
Fig. 2.
Inventor
Vance S. Firestone Jan. 23, 1951 V. S. FIRESTONE 2,539,240
METHOD AND APPARATUS FOR CUTTING TIRE TREAD STOCK
Filed March 31, 1948 5 Sheets-Sheet 2

Inventor
Vance S. Firestone

Jan. 23, 1951 V. S. FIRESTONE 2,539,240
METHOD AND APPARATUS FOR CUTTING TIRE TREAD STOCK
Filed March 31, 1948 5 Sheets-Sheet 3

Inventor
Vance S. Firestone

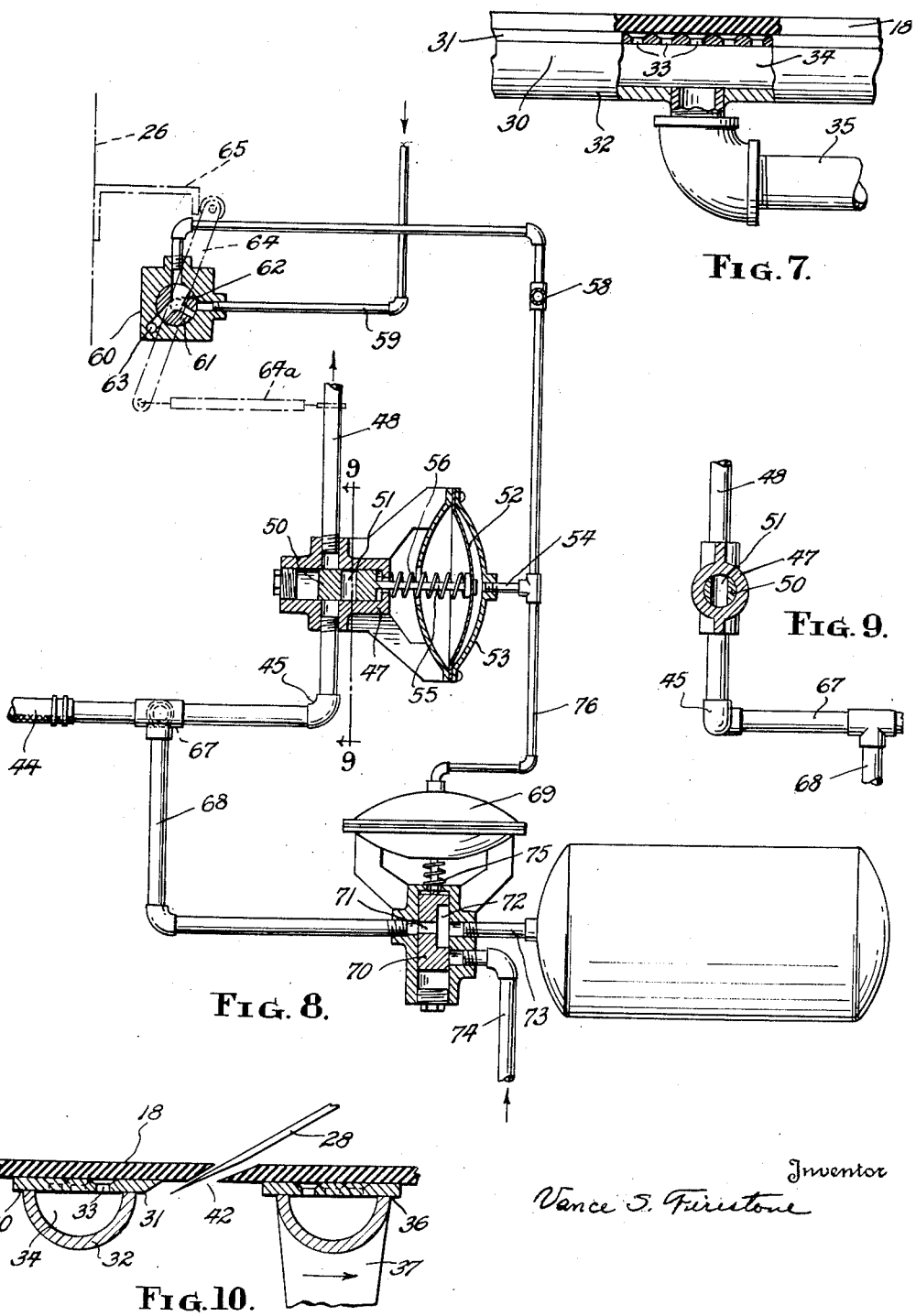

Jan. 23, 1951  V. S. FIRESTONE  2,539,240
METHOD AND APPARATUS FOR CUTTING TIRE TREAD STOCK
Filed March 31, 1948  5 Sheets-Sheet 5

Inventor
Vance S. Firestone

Patented Jan. 23, 1951

2,539,240

UNITED STATES PATENT OFFICE 2,539,240

METHOD AND APPARATUS FOR CUTTING TIRE TREAD STOCK

Vance S. Firestone, Newark, Ohio, assignor, by mesne assignments, to Carlisle Corporation, Carlisle, Pa., a corporation of Delaware Application March 31, 1948, Serial No. 18,266

9 Claims. (Cl. 164—76)

The present invention deals with methods and apparatus for cutting flexible sheet stock, and has particular reference to improved methods and apparatus for cutting rubber tire tread stock into tread-forming strips of predetermined length.

In the past, considerable difficulty has been encountered when attempting to cut uncured relatively heavy, resilient and partially tacky rubber or synthetic rubber strips or sheets used to form the tread portion of pneumatic tires, due to the relative yieldable properties of the tread stock, and its tendency to crumble and adhere to a knife blade during cutting operations. Various attempts have been made to overcome these objectionable tendencies and characteristics of the tread stock in resisting clean cutting, such as by carrying out the cutting operations under water, or under liquid spray, or, as outlined in my previous United States Patent No. 2,181,398, dated November 28, 1939, by cutting the stock on a bias by means of a high speed rotary knife. While these attempts have, to some extent, overcome the objectionable characteristics above mentioned, no entirely satisfactory method or apparatus has heretofore been commercially used, whereby tire tread stock could be cut efficiently and cleanly without a certain amount of material building up on the knife or other cutting instrumentality, thereby necessitating the intermittent shut-down of the apparatus for cleaning purposes, or without jagged or uneven severance lines being obtained within the tread-forming strips.

It follows therefore, that the primary object of this invention is to provide improved methods and apparatus for efficiently and cleanly severing relatively flexible sheet stock into strips of predetermined lengths, which methods and apparatus lend themselves to substantially continuous high speed operations.

It is another object of this invention to provide a machine for cutting tire tread stock which embodies a pair of vacuum hold-down plates interposed within a conveyor surface, and operable to firmly grip and resiliently tension the tread stock during severance thereof by an associated cutting instrumentality, whereby the stock is drawn away from the cutting instrumentality immediately upon passage thereof through the stock, thereby preventing unnecessary contact of the rubber stock with the cutting instrumentality after severance has been effected.

It is a further object of this invention to provide improved methods for cutting tire tread stock, or similar flexible sheet stock, by firmly holding the same under elastic tension during the passage of a cutting instrumentality therethrough, whereby the severed portion of stock is immediately freed from contact with the cutting instrumentality, and completely parted from the remaining body portion of the stock.

It is still another object of this invention to provide apparatus of the character described, whose function is controlled efficiently and economically through the use of vacuum-producing means having associated therewith relatively simple, yet efficient valve controls.

For a further and more detailed understanding of the present invention and the various additional objects and advantages thereof, reference is made to the following description and the accompanying drawings wherein:

Fig. 1 is a side elevational view of a tread cutting machine formed in accordance with the present invention;

Fig. 2 is a top plan view thereof;

Fig. 7 is an enlarged fragmentary side elevational view, partially in vertical section, of one of the vacuum hold-down plates and its associated pressure connection;

Fig. 8 is a plan view of the control system embodied in the present machine, and disclosing the associated valve members in vertical cross-section;

Fig. 9 is a vertical sectional view taken along the line 9—9 of Fig. 8;

Fig. 10 is an enlarged vertical sectional view taken through the relatively separable vacuum hold-down plates, and disclosing their operating relation to the associated rotary cutting blade and tread stock;

Figure 4:
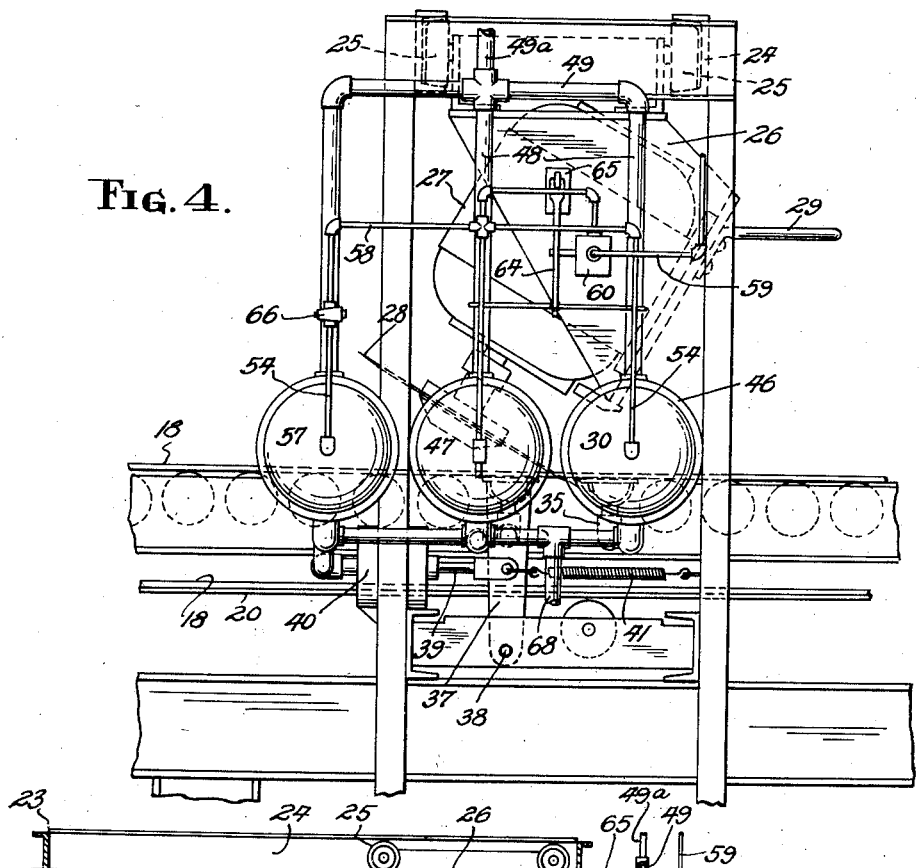
Fig. 4 is an enlarged detailed side elevational view of the present tread-cutting machine, looking toward the vacuum-control system thereof.

Referring now to the drawings, the numeral 15 generally designates an elongated angle iron frame which advantageously may form a continuation of a complemental frame 16 which is provided upon its upper surface with a plurality of anti-friction rolls 17 which serve to convey a continuous sheet of extruded tread stock 18 away from the associated extrusion machine. The frame 15 is provided with a plurality of vertical side members between which are supported a liquid-holding trough or tank 19 through which the continuous sheet of tread stock passes for cooling after initial extrusion. From the tank, the sheet stock 18 is directed, by means of a continuous conveyor belt 20 backwardly across the frame 15, with the free end thereof being manually placed longitudinally upon a relatively elevated conveyor bed 21 which also comprises a plurality of anti-friction rolls 22. The conveyor bed 21 is carried upon the upper portion of the base frame 15, in vertically spaced relation to the conveyor belt 20, in order to provide sufficient clearance for the passage of the tread stock upon the continuous belt conveyor 20 beneath the conveyor bed.

Arising vertically upward from the base frame 15 is a superstructure or head frame 23 which extends across the conveyor bed 21. The superstructure 23 is provided with a pair of inwardly directed channel members 24 in which are slidably positioned a pair of anti-friction rolls or wheels 25 carried by a transversely movable motor bracket or carriage 26. Supported in a diagonal position upon the carriage 26 is an electric motor 27 which directly drives a circular cutting knife 28 disposed in acutely angular relationship to the plane of the conveyor bed 21. The carriage 26 is provided with an outwardly extending handle 29 by which the entire carriage, motor and knife may be manually moved transversely across the conveyor bed during cutting operations.

Interposed within the conveyor bed 21, between a pair of adjacent anti-friction rolls 22, and extending transversely thereof, is a first stationary vacuum hold-down plate 30 which is provided at its upper surface with a perforate relatively horizontal head plate 31 and an integral enclosed channel member 32. The perforations of the vacuum hold-down plate 30 comprise a plurality of relatively closely spaced and countersunk openings 33 which open toward the upper surface of the conveyor bed, and communicate interiorly of the plate with an enclosed chamber 34. Also communicating with the chamber 34 is a vacuum and pressure supply line 35 which extends outwardly beneath the conveyor bed 21 to one side thereof.

Disposed in longitudinally spaced relation to the stationary hold-down plate 30 is a second similarly formed hold-down plate 36 which is provided at either end with a pair of supporting and depending brackets 37 which, in turn, are pivotally mounted, as at 38, to the side members of the frame 15 in a manner to permit of relatively limited pivotal rocking movement thereon. Pivotally linked with the intermediate portion of one of the brackets 37, is the outer end of a piston rod 39 extending exteriorly of a suction-actuated ram 40. Also connected with the bracket 37, opposite the piston rod 39 of the ram, is a contractile spring 41 which functions to hold the bracket and the associated hold-down plate against relative separating movement with respect to the stationary plate 30. The suction-actuated ram 40 operates in response to subatmospheric pressures established therein to impart outward separating movement to the second plate 36 with respect to the stationary plate 30, in order to increase the normal longitudinal spacing between the two hold-down plates.

As shown particularly in Fig. 10 of the drawings, the normal spacing between the two vacuum hold-down plates provides a transversely extending knife passage 42 through which the outer peripheral portion of the rotary cutting blade 28 may pass upon transverse movement thereof with respect to the conveyor bed 21. Communicating with the underside of the movable hold-down plate 36, is a hose connection 43 which, in turn, is connected with the outer end of a flexible conduit 44 extending beneath the conveyor bed 21 and outwardly to one side of the upper frame or super structure 23.

The outer end of the hold-down plate conduits 35 and 44 are provided with elbow joints 45 which provide vertically upward continuations of the conduits, and communicate with the lower side of a pair of two-way diaphragm-type valves 46 and 47. The opposite connections of the valves 46 and 47 are provided with vacuum-supply lines 48 which extend upwardly of the superstructure 23 and terminate in a common manifold 49. It will be understood, that the manifold 49 is connected with a central vacuum-supply line 49a which is coupled with a suitable remotely disposed fluid-displacement pump, not shown. Each of the diaphragm-type valves embody a sliding spool or gate 50 which is provided with a vertically extending channel 51 which, in response to movement of the spool 50, may be brought into and out of registration with the vacuum supply line 48, and the upward extension of the hold-down plate conduits 35 and 44. The movement of the spool 50 is controlled through the operation of a flexible diaphragm 52 which is enclosed within a suitable elliptical housing 53, and which is responsive to fluid pressure introduced in one side of the housing through a fluid supply line 54. The diaphragm 52 and the associated spool valve 50 are integrally joined by a connecting rod 55 around which is disposed a coil spring 56 which functions to normally hold the spool valve 50 in a closed position with respect to the registering conduits 48 and 44. In operation, each of the diaphragm valves function in response to superatmospheric pressures exerted upon the diaphragm face to move the spool valve 50 into registration with the vacuum-supply line 48 and the respective hold-down conduits, in order that sub-atmospheric pressures may be established within each of the hold-down plates.

Figure 3:
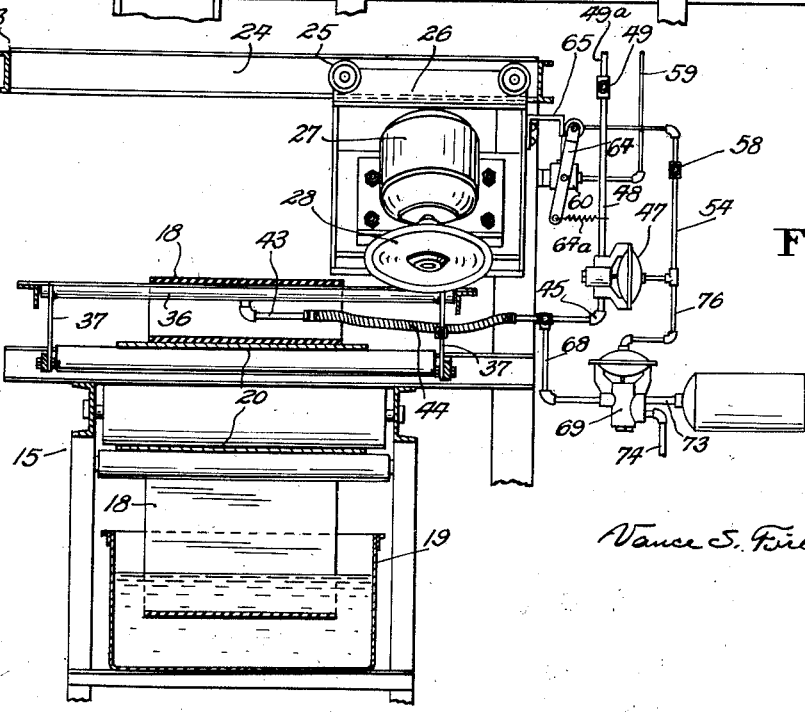
Fig. 3 is an enlarged vertical sectional view taken along the line 3—3 of Fig. 1.
Figure 5:
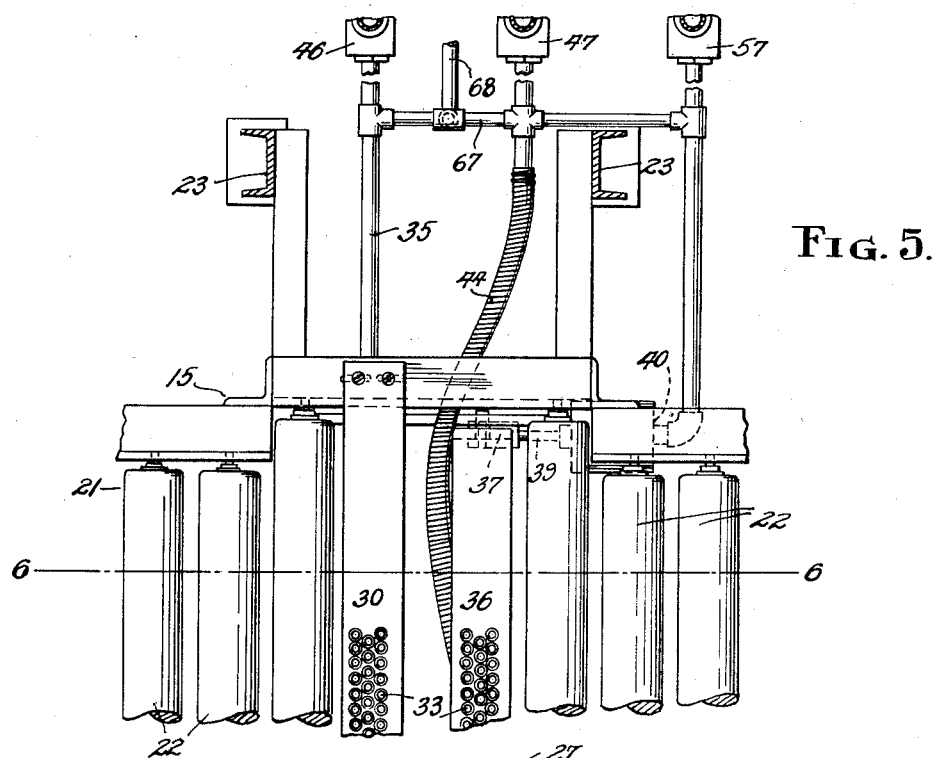
Fig. 5 is an enlarged fragmentary horizontal sectional view taken through the present machine directly above the associated conveyor bed and interposed vacuum hold-down plates.
Figure 6:
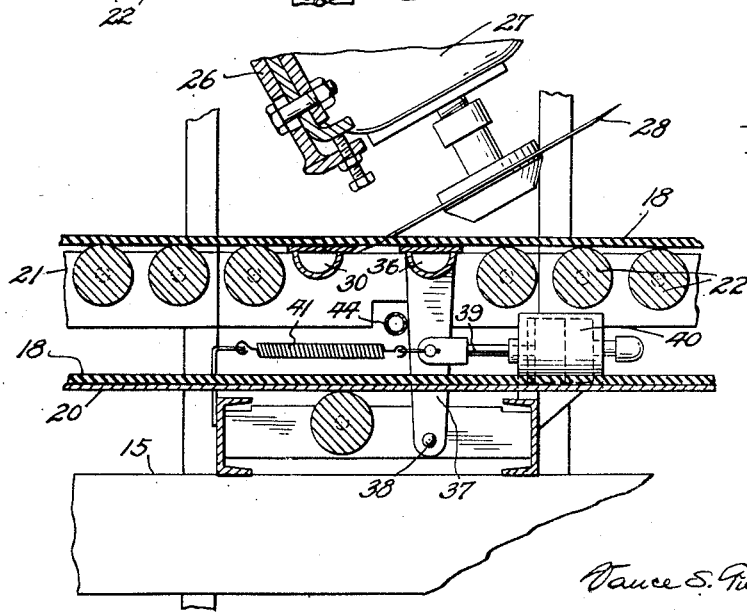
Fig. 6 is a fragmentary vertical sectional view taken along the line 6—6 of Fig. 5.

The operation of the suction-actuated ram 40 is controlled in a similar manner by an identical valve 57 which is connected with a third branch or the vacuum-supply manifold 49, and with a conduit communicating with the ram 40. Each of the fluid-supply lines 54 communicating with the respective valves, are joined by a common manifold 58 which, in turn, is connected with a single fluid pressure supply line 59 in which is interposed a three-way valve 60 which provides for the introduction of superatmospheric pressure within the respective diaphragm valves, and for the exhausting of superatmospheric pressures therein. As shown particularly in Fig. 8 of the drawing, the valve 60 is formed with an inner rotatable spool or core 61 in which is formed a three branch channel 62 which, upon proper rotation of the core 61 will bring the pressure supply line 59 into registration with the complemental supply line, in order to introduce fluid under pressure to each of the diaphragm valves, and in addition to move into a second position permitting pressures within the valves and associated lines to be exhausted through an exhaust opening 63 formed in the valve body, at the same time closing the pressure supply line 59. The movement of the core or spool 61 is controlled by means of a lever 64 carried exteriorly of the valve casing, and spring-pressed, as at 64a, so as to assume a position normally permitting of the entrance or passage of pressure to each of the valves. The operation of the lever 64 is controlled by movement of the knife carriage 26 which is provided with an outwardly extending bracket 65 for engagement with the upper end of the trip lever 64. In operation, when the knife and its associated carriage 26 occupies a normal position of rest to one side of the conveyor bed as shown in Fig. 3 of the drawings, the bracket 65 will hold the valve lever 64 in a closed position preventing the entrance of fluid under pressure within the pressure supply lines 54 and the associated diaphragm valves. Conversely, as the knife and its carriage are drawn transversely across the conveyor bed and out of engagement with the valve lever 64, the same will move under spring tension to an open position permitting the entrance of fluid under pressure within the respective pressure supply lines and the associated diaphragm valves, to open the same thereby permitting communication between the vacuum-supply line 48 and the hold-down conduits 35 and 44, to establish subatmospheric pressures within the respective hold-down plates, and to actuate the ram 40 to cause relative separating movement between the two hold-down plates. In the above outlined operation, it has been found advantageous to retard the action of the ram 40 in separating the two plates, with respect to the application of vacuum therein. Toward this end, the pressure supply line associated with the ram-controlling diaphragm valve 57 is provided with an interposed check valve 66 which retards the action of the valve 57 until the remaining valves 30 and 47 have completely opened to establish subatmospheric pressures within the hold-down plates, at which time pressure may be introduced within the valve 57 permitting operation of the ram 40 to move the second hold-down plate 36 relative to the stationary plate 30.

It will thus be seen, that a sheet of tread stock carried upon the conveyor bed 21 in spanning relation to the two hold-down plates 30 and 36, will first be subjected on either side of the knife passage 42 to vacuum pressures tending to clamp the tread stock firmly to each of the hold-down plates, and afterwards, due to the relative separating movement of the movable plate, the tread stock will be resiliently tensioned, and slightly stretched across the knife passage 42 prior to the passage of the rotary cutting blade 28 across the conveyor bed and through the tread stock. It will here be understood, that the operation of the various vacuum-creating instrumentalities is controlled by the displacement of the knife and its associated carriage, in initially drawing the same away from its normal position of rest against the valve lever 64, thus assuring that tread stock positioned across the hold-down plates will be firmly held and resiliently tensioned prior to the passage of the knife blade therethrough, and after severance of the stock, that portion held by the movable vacuum hold-down plate will be immediately withdrawn from contact with the knife blade 28. This action is particularly illustrated in detail in Fig. 10 of the drawing.

Advantageously, the present apparatus may be provided with a blow-back system which functions to momentarily discharge a blast of compressed air within each of the vacuum hold-down plates and the ram 40, in order to abruptly disengage the severed portions of strip stock from the plates, and additionally to relieve the vacuum pressure within the ram 40, to allow the same to return to its position of rest, and permitting the movable hold-down plate to once again return to its normal position in spaced relation to the stationary plates. Figs. 3 and 8 of the drawings illustrate one system which may be adapted for this purpose, in conjunction with the previously outlined fluid pressure system. The respective conduits leading to the ram 40, the stationary hold-down plate 35, and the movable hold-down plate 36 are joined below the diaphragm valves by a common manifold conduit 67 in which is interposed a single compressed air supply conduit 68 leading from a diaphragm type valve 69, of somewhat similar structure to the diaphragm valves previously outlined. The valve structure 69 differs from the previously outlined valve in that the same is provided with a slidable spool or gate 70 which is formed with a single passage 71 for registration with the supply line 68, and additionally with a relatively enlarged passage or chamber 72 permitting of simultaneous registration with a compressed air tank outlet 73, and a compressed air inlet line or conduit 74. The gate 70 of the valve 69 is responsive to the movement of a flexible diaphragm and associated push rod 75 which in turn, is actuated by fluid pressure introduced within the valve through an extension conduit 76 which is tapped into one of the three branches of the fluid pressure supply line 59, whereby pressure is supplied to the valve 69 simultaneously with the other diaphragm valves upon operation of the cutting knife. As shown in Fig. 8 of the drawings, the spool or gate 70 of the valve 69 normally occupies a position permitting of communication between the compressed air tank outlet 73 and the pressure supply line 68. In response to pressure acting through the fluid pressure system 58 upon the diaphragm of the valve 69, the gate is moved downwardly to close the conduit 68, and to open the tank outlet 73 to the incoming compressed air supply line 74, in order that the tank may be initially charged with compressed air at the time the hold-down plates and ram are being subjected to subatmospheric operation. As the knife returns from its cutting operation to its normal position of rest to one side of the conveyor bed, with the bracket 65 engaging the valve lever 64, pressure is released upon the valve 69 to return the sliding gate 70 to its pressure opening position, at the same time closing off the pressure supply conduit 74, and discharging the stored compressed air from the associated compressed air tank through the outlet conduit 68 and into the respective hold-down plates and ram. At this time, tread stock held under vacuum upon the hold-down plates will be blown away from the surfaces thereof, and the ram and movable hold-down plate will be returned to its original position. It will be understood, that the pressures involved with respect to the blow-back system are relatively small, and are maintained with sufficient force only to initially puff the sheet stock away from the perforations of the hold-down plate, thereby speeding the overall cutting operation, and returning the machine to a normal condition for another cycle of operation.

Figure 11:
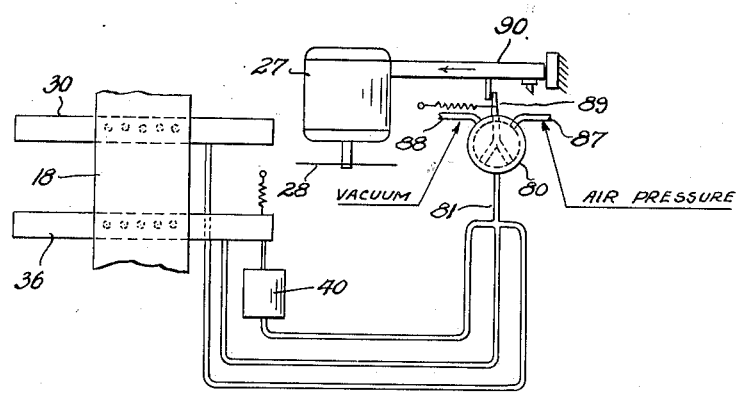
Fig. 11 is a diagrammatic illustration of a modified form of control mechanism which may be utilized in association with the present tread cutting machine.
Figure 12:
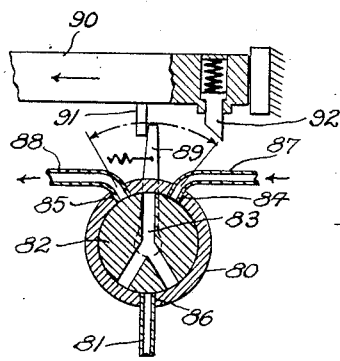
Fig. 12 is a detailed vertical sectional view taken through a valve of the type embodied in the modified control mechanism disclosed in Fig. 11.

Figs. 11 and 12 of the drawings disclose a modified type of control system utilized to control the action of the hold-down plates 30 and 36 and the suction-actuated ram 40 in response to the movement of the cutting blade and its associated carriage. This modified system utilizes a three-way, three position, Y-valve 80 which is connected with the two hold-down plates and the ram 40 by a three-branch conduit 81. The valve 80 is constructed with an inner rotatable spool 82 in which is formed a Y-shaped channel 83. Positioned for separate registration with the channel 83 are three conduit connections 84, 85 and 86. The conduit 81 is connected with the valve at connection 86, and the remaining connections 84 and 85 are coupled respectively with a compressed air supply line 87 and a vacuum supply line 88. The valve is provided with an external and laterally offset operating lever 89 which controls the position of the spool 82. The operating lever 89 is spring-pressed to a position permitting of communication between the vacuum supply line 88 and the conduit 81 leading to the hold-down plates and ram, whereby subatmospheric pressures may be established therein. In addition, the lever is movable against spring tension to positions providing communication between the compressed air supply line and the conduit 81, and a neutral position closing all three connections. The movement of the valve lever 89 is controlled by an extension 90 which is carried by the blade carriage 26 above and in the vertical plane of the lever. The extension is provided with a pair of spaced depending latches 91 and 92 which serve to engage the upper portion of the lever during different stages of travel of the extension. The latch 91 is rigidly carried by the extension, and merely acts as a stop for the lever, while the other latch 92 is mounted on the extension, in the manner of the common door latch, for spring tensioned swinging movement in one direction only. The swinging latch 92 is positioned toward the outermost end of the extension 90 and is arranged for swinging movement inwardly of the extension when the carriage and cutting blade are moved from their normal position of rest to one side of the conveyor bed and across the same.

In operation, with the carriage and extension occupying a rest position to one side of the conveyor bed, the operating lever 89 is held in a neutral position by the latch 91, thus preventing the establishment of either sub or superatmospheric pressures within the plates and ram. As the carriage and extension are moved outwardly across the conveyor bed, the rigid latch 91 is drawn out of engagement with the lever 89 permitting the same to move under spring tension to a position establishing communication between the vacuum supply line 88, and the hold-down plates 30 and 36 and the ram 40. The spring-pressed latch 92 which extends slightly below the stationary latch 91 will then ride over the upper end of the lever 89 at the same time being moved inwardly of the extension. After a cut has been made, and as the carriage and extension are being returned to their rest positions, the spring-pressed latch 92, which is now held against swinging movement with respect to the extension, engages the upper portion of the valve lever and swings the same in an arcuate path to a position establishing communication between the compressed air line 87 and the hold-down plates and ram. At this position, further movement of the carriage and extension toward their position of rest causes the latch 92 to ride over the upper end of the lever, due to the arcuate movement thereof, and permits the lever to snap back under spring tension to a neutral position in engagement with the stop latch 91. It will thus be seen, that the opening of the compressed air supply line 87 to the plates and ram is only momentary as the extension and blade carriage return to their position of rest. This momentary opening of the compressed air line causes the partial vacuum within hold-down plates and ram to be relieved and additionally exerts a small blow-back pressure upon the severed end portions of the tread stock to initially free the same from contact with the hold-down plates.

In the actual operation of the machine, the free end portion of the continuous sheet of uncured tread stock 18 is manually directed upon the conveyor bed 21 simultaneously with the operation of the continuous conveyor belt 20. The free end portion is then slid longitudinally of the bed 21 until engagement is made between the end edge of the stock and a longitudinally adjustable stop device 93 which is carried by the frame 15 in predetermined longitudinally spaced relation to the plane of movement of the cutting blade 28. Thus a definite and predetermined length of stock is obtained between the blade and stop device, which length corresponds to that desired for the tread of a given size of pneumatic tire. At this time, the cutting blade and carriage are moved out of their rest positions to establish sub-atmospheric pressures within the hold-down plates 30 and 36, causing the tread stock to be firmly gripped, and within the ram 40 to cause separating movement of the movable plate 36 and to elastically tension the tread stock between the two plates. The tread stock is then severed cleanly between the two plates upon complete transverse movement across the conveyor bed. The cutting blade and carriage are then moved backwardly across the bed to their rest positions to momentarily operate the blow-back system to free the severed ends of tread stock from the plates. The cycle of operation is then repeated with respect to the next length of tread stock until the continuous sheet has been entirely severed into a multiplicity of strips of predetermined length.

In view of the foregoing, it will be seen that the present invention provides efficient apparatus and methods for cutting uncured normally thick and relatively flexible tire tread stock into strips of uniform and predetermined lengths. Machines formed in accordance with the present invention are characterized by their ability to cut tread stock evenly and smoothly without benefit of water lubrication and ambient elaborate equipment. Such machines greatly reduce the number of operators normally required during cutting operations carried out with previously known machines of this type. Particularly, machines embodying the present invention are characterized by their ease of operation, their economy of maintenance and operation, and their mechanical efficiency.

While certain preferred embodiments have been disclosed in detail, it will be understood that various changes as to constructional details may

I claim:

1. Apparatus for cutting relatively flexible sheet stock comprising a conveyor bed for the sliding reception of sheet stock introduced longitudinally thereon, a pair of spaced relatively movable perforate suction members disposed transversely of and within the plane of said conveyor bed; said suction members being operable in response to subatmospheric pressures established therein to rigidly hold sheet stock positioned upon said conveyor bed and spanning said members, and upon relative separating movement to tension such stock between said members; a cutting device movable across said conveyor bed between said suction members and operable to sever sheet stock held under tension by the latter, and means responsive to the movement of said cutting device for establishing subatmospheric pressures within said members and for imparting relative separating movement thereto.

2. Apparatus for cutting relatively flexible sheet stock comprising a conveyor bed for the sliding reception of sheet stock introduced longitudinally thereon, a pair of spaced relatively movable perforate suction members disposed transversely of and within the plane of said conveyor bed; said suction members being operable in response to subatmospheric pressures established therein to rigidly hold sheet stock positioned upon said conveyor bed and spanning said members, and upon relative separating movement to tension such stock between said members; a cutting device movable across said conveyor bed between said suction members and operable to sever sheet stock held under tension by the latter, and means responsive to the movement of said cutting device for establishing subatmospheric pressures within said members and for imparting relative separating movement thereto, said last named means including a vacuum-actuated ram connected with one of said suction members and operable to move the latter relative to the other of said members, a vacuum line communicating with said suction members and said ram, and a valve operable by said cutting device to alternately open and close said vacuum line.

3. In a machine for cutting sheet stock, a conveyor bed for the sliding reception of sheet stock introduced longitudinally thereon, a pair of relatively separable suction members interposed within said conveyor bed and extending transversely thereof, said members being operable to hold and tension sheet stock positioned on said conveyor bed and extending across said members upon establishment of subatmospheric pressures therein and upon relative separating movement, a cutting device carried above said conveyor bed for movement across the same and between said suction members, said cutting device being operable upon such movement to sever sheet stock held and tensioned by said members, and means responsive to the movement of said cutting device for establishing subatmospheric pressures within said suction members and for effecting relative separation thereof.

4. Apparatus for cutting flexible sheet stock comprising a frame provided with a longitudinally extending conveyor surface for the sliding reception of relatively flexible sheet stock, a pair of spaced and relatively movable perforate suction plates carried by said frame and interposed transversely within the plane of said conveyor surface, the spacing between said plates providing a passageway extending transversely through the plane of said conveyor surface, a cutting device carried by said frame for movement across said conveyor surface, said cutting device extending within the passageway between said plates and operable upon movement across said conveyor surface to sever sheet stock positioned thereon and spanning said suction plates; suction-actuated means carried by said frame for imparting relative separating movement to said suction plates, a suction line communicating with said suction plates and with said suction-actuated means, and valve means associated with said suction line and responsive to the movement of said cutting device for opening and closing said suction line to said suction plates and said suction-actuated means.

5. In apparatus for cutting tire tread stock into strips of predetermined length, a conveyor bed including a plurality of transversely disposed antifriction rolls for the sliding reception of tread stock introduced longitudinally thereon, a first stationary perforate suction plate interposed transversely within said conveyor bed between a pair of said antifriction rolls, a second relatively movable perforate suction plate disposed in longitudinally spaced relation to said first suction plate and defining therewith a transversely extending knife passage, a rotary cutting knife arranged for transverse movement across said conveyor bed between said suction plates, means communicating with said suction plates for establishing a partial vacuum therein, whereby tread stock positioned on said conveyor bed and spanning said plates may be held by suction against the latter, and means connected with said movable suction plate for imparting separating movement thereto with respect to said stationary plate, whereby tread stock held by suction against said plates may be resiliently tensioned prior to cutting by said knife.

6. In apparatus for cutting tire tread stock into strips of predetermined length, a conveyor bed including a plurality of transversely disposed antifriction rolls for the sliding reception of tread stock introduced longitudinally thereon, a first stationary perforate suction plate interposed transversely within said conveyor bed between a pair of said antifriction rolls, a second relatively movable perforate suction plate disposed in longitudinally spaced relation to said first suction plate and defining therewith a transversely extending knife passage, a rotary cutting knife arranged for transverse movement across said conveyor bed between said suction plates, means communicating with said suction plates and responsive to the transverse movement of said knife for establishing a partial vacuum within said plates, whereby tread stock positioned on said bed in spanning relation to said plates may be held by suction thereto, and means connected with said movable suction plate and responsive to the movement of said knife for imparting limited separating movement thereto with respect to said stationary plate, whereby tread stock held by said plates may be resiliently tensioned prior to cutting by said knife.

7. In apparatus for cutting relatively flexible sheet stock, a conveyor bed for the sliding reception of sheet stock introduced longitudinally thereon, a pair of spaced and relatively movable vacuum hold-down plates interposed within said conveyor bed and extending transversely thereof, said plates being operable in response to subatmospheric pressures established therein to rigidly hold sheet stock received on said conveyor bed and spanning said plates, and upon relative separating movement to tension such stock between said plates, a cutting device arranged above said conveyor bed for movement transversely thereof between said plates, means connected with one of said plates for imparting relative separating movement thereto, and means communicating with each of said plates for alternately establishing subatmospheric and superatmospheric pressures therein.

8. In apparatus for cutting relatively flexible sheet stock, a conveyor bed for the sliding reception of sheet stock introduced longitudinally thereon, a pair of spaced and relatively movable vacuum hold-down plates interposed within said conveyor bed and extending transversely thereof, said plates being operable in response to subatmospheric pressures established therein to rigidly hold sheet stock received on said conveyor bed and spanning said plates, and upon relative separating movement to tension such stock between said plates, a cutting device arranged above said conveyor bed for movement transversely thereof between said plates, means connected with one of said plates for imparting relative separating movement thereto, and means communicating with each of said plates for alternately establishing subatmospheric and superatmospheric pressures therein, said last-named means being operable in response to the transverse movement of said cutting device.

9. The method of cutting tire tread stock which comprises bridging an intermediate portion of the stock between supports, anchoring the stock on either side of its bridging portion to the supports by vacuum pressures applied to the support-contacting surfaces thereof, placing the bridging portion of the stock under elastic tension, and thereafter cutting the said stock along the bridging portion thereof while under elastic tension.

VANCE S. FIRESTONE.

REFERENCES CITED

The following references are of record in the file of this patent:

UNITED STATES PATENTS

| Number | Name | Date |
|---|---|---|
| 1,758,729 | Wilson | May 13, 1930 |
| 2,429,944 | Rayburn et al. | Oct. 28, 1947 |
| 2,429,945 | Rayburn | Oct. 28, 1947 |